May 4, 1965 M. SCHLICHTE 3,182,133

CIRCUIT ARRANGEMENT FOR ATTENUATING AND DE-ATTENUATING TWO-CONDUCTOR LINES

Filed Sept. 24, 1962 2 Sheets-Sheet 1

United States Patent Office 3,182,133

Patented May 4, 1965

3,182,133

CIRCUIT ARRANGEMENT FOR ATTENUATING AND DE-ATTENUATING TWO-CONDUCTOR LINES

Max Schlichte, Munich, Germany, assignor to Siemens & Halske Aktiengesellschaft Berlin and Munich, a corporation of Germany Filed Sept. 24, 1962, Ser. No. 225,722

Claims priority, application Germany, Sept. 26, 1961, S 75,937

7 Claims. (Cl. 179—15)

Figure 1:
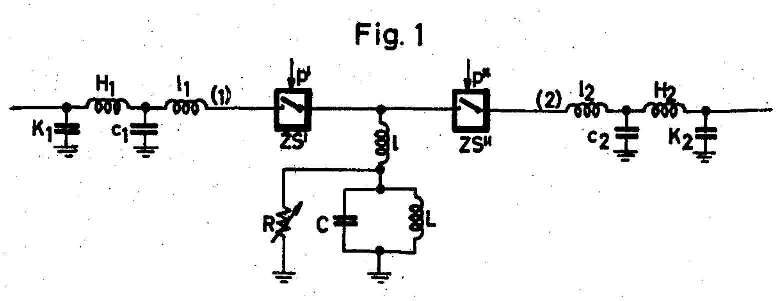
Figure 2A:
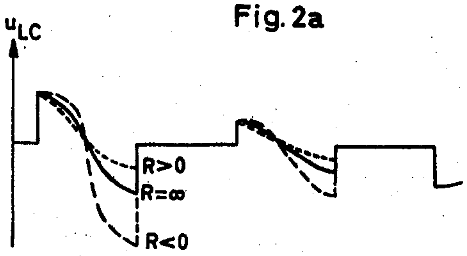
Figure 2B:
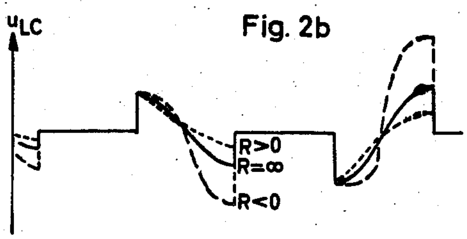
Figure 2C:
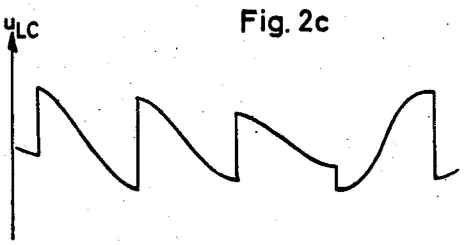
Figure 2D:
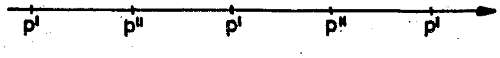

The invention disclosed herein is concerned with a circuit arrangement for attenuating and de-attenuating two-conductor lines.

In telecommunication transmission systems, communication signals must frequently be transmitted over two-wire lines of different length and different nature between two end stations. This is true, for instance, in telephone lines which depending on the distance of the individual subscribers from their central office, and possibly also the distance of two central offices from each other, must be conducted over subscribers' lines and trunk lines of entirely different length and nature. Accordingly, the signals transmitted between the two end stations of such transmission systems over the communication line in question are attenuated to a different extent in each individual case. Such a difference in the attenuation is, however, generally undesirable, since for instance in view of the noise frequently prevailing in the vicinity of the electro-acoustic transducer of the two end stations and disturbing sidetone signals, the reference equivalent of such a transmission system should lie within very specific limits of about 1 to 2.5 neper. For this purpose, however, it is necessary that the communication line has between the two end stations, which, as stated, may possibly consist of different line sections, a line attenuation which is substantially independent of the length and nature of the line.

In order to obtain an equivalent attenuation of transmission systems as uniform as possible, regardless of the lines lying in the specific case between the end stations, it is already known to compensate in different manners for differences of attenuation in different lines. Thus, for instance, it is known to insert in subscriber stations between the two wires of the subscriber's line, a non-linear resistance which is controlled by the D.C. supply current which is transmitted over the subscriber's line and is dependent on the line attenuation so that with an increase in the loop current (in case of a short line or a large conductor cross-section), the contribution to the attenuation on the part of the non-linear resistance increases and conversely, decreases upon a decrease in the loop current, whereby an equalizing of the amount of attenuation is obtained. By such a measure, however, one can merely obtain the result that the reference equivalent of a transmission system does not become too small. Furthermore, it is known to use negative series resistors or negative shunt conductances for the removal of the attenuation from lines. In this connection, however, it is possible by means of a negative series resistance only to avoid losses which would otherwise be caused by ohmic series conductances lying directly in series therewith; by means of a negative shunt conductance, only losses can be avoided which are otherwise caused by ohmic shunt conductances lying directly parallel thereto. In this way, one can only obtain the result that the attenuation of a transmission system is reduced. If one were to make the contribution of the negative resistance or negative conductance greater than that of the loss resistance or conductance, undesired oscillations would be produced in the corresponding transmission system. For the removal of attenuation from lines, negative resistances and conductances can also be inserted jointly as so-called negative impedance amplifiers in the line. By means of such an negative impedance amplifier which, in principle, can be developed as a T-member of negative shunt conductance bridged by a negative series resistance, losses of ohmic series resistances as well as shunt conductances can be compensated. In this connection, the negative impedance amplifier is rigidly set with respect to its amount of amplification corresponding to the degree of attenuation of the line in which it is inserted. The amount of amplification which is obtainable without undesired oscillations occurring is in this connection higher the higher the echo attenuation in the corresponding transmissions system. This reqiures substantially reflection-free line connecting points; the characteristic impedance of the negative impedance amplifier must as far as possible be made equal to the characteristic impedance of the connected line. A change in the amplifier setting is not readily possible; rather for this purpose, both the negative series resistance and the negative shunt conductance must be changed, in which connection, however, a specific mutual dependence on each other must be taken into consideration in order to be able insofar as possible to maintain the original matching conditions. When employing the known measures, there are used in any event, depending on the amount of attenuation of a line already present, different attenuation compensating circuits, depending on whether additional attenuation or removal of attenuation is to be obtained.

The present invention now proceeds along an entirely different path in order to be able, with one and the same circuit to effect either an attenuation of a two-wire line or removal of attenuation therefrom, depending on the requirements. The invention thus relates to a circuit for the attenuating of two-wire lines and removal of attenuation therefrom; this circuit is characterized by two periodically actuated switches staggered in time with respect to each other, inserted in series in the two-wire line, to the connecting point of which switches there is connected an energy storer having a time constant which is variable as a function of a control signal. The invention makes it possible to obtain in a two-wire line either a removal of attenuation or else additional attenuation without it being necessary to make any change in the construction of the circuit in accordance with the invention. Rather, it is merely sufficient by means of a suitable control signal to vary the time constant of the energy storer contained in the circuit of the invention, i.e., the time constant which is controlling for the rapidity of the decrease or increase of the signal energy stored in the storer in order to obtain either in case of a relatively large positive time constant a greater or smaller attenuation or in the case of a relatively large negative time constant, a larger or smaller removal of attenuation. The circuit in accordance with the invention offers in this connection the possibility of being able, in a simple manner, to effect a change in the amount of attenuation or amplification without this having a disturbing influence on the matching conditions in the transmission system in question.

The circuit in accordance with the invention is in particular advantageous where the signals which are to be transmitted over the line, in which the attenuation or removal of attenuation is to be effected, from the two end stations in each case to the other end stations, are present already in pulse amplitude modulated form so that they are fed in each case precisely at the moment of closing of one of the two switches over same to the energy storer and are given off and transmitted further at the moment of closing, in each case of the other of the two switches. This is true for instance in time-multiplex telephone exchange systems, the subscriber lines of which can be connected, staggered in time with respect to each other, in each case by means of time channel switches, periodically in pulse-like fashion to a two-wire multiplex bar which is connected with a coupling network over which connections of a subscriber's line of the time multiplex exchange system with another subscriber's line, both of the same and of a different exchange system, are made. The circuit in accordance with the invention is, however, not limited to such a requirement; it can rather also be used advantageously when the signals to be transmitted over the line have not previously been modulated on a train of pulses. Since the switches contained in the circuit of the invention are closed each time only in pulse-wise fashion while the opening times cannot transmit energy over the switches, it is advisable in this connection, in the latter case to take special measures to avoid impairment of the energy transfer.

Such measures will be discussed below when explaining the invention with reference to the accompanying drawings.

FIG. 1 shows a circuit arrangement in accordance with the invention for the attenuation of a two-conductor line for removing attenuation therefrom;

FIGS. 2*a* to 2*d* are voltage curves; and

Figure 3:
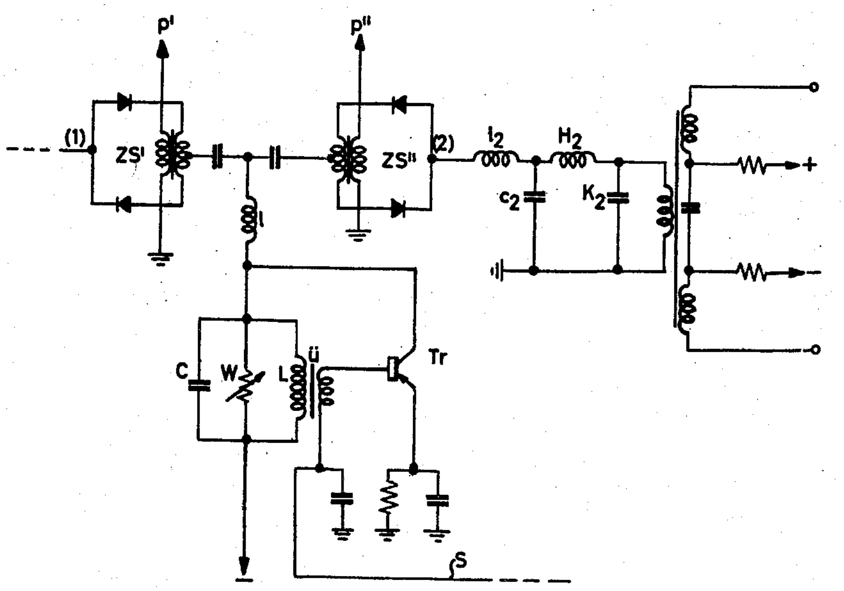

FIG. 3 shows details of the circuit arrangement.

In FIG. 1, the energy storer having a time constant which is variable as a function of a control signal is formed by a parallel oscillatory circuit consisting of the capacitor C and the coil L which has a parallel resistance R controlled by the control signal. This parallel oscillatory circuit is connected to the connecting point of the two switches ZS′ and ZS″ inserted in series in the two-wire line (1), (2). The switches ZS′ and ZS″ can be developed in this connection as electronic switches. The parallel oscillatory circuit is tuned to a resonant frequency which is equal to the switching frequency with which the two switches ZS′ and ZS″ are closed, staggered uniformly with respect to each other in time or equal to an integral multiple of said frequency. The parallel resistance R can be controlled in such a manner as a function of a control signal that its resistance value is positive, infinite or negative. For this purpose, the parallel resistor R can be formed of an ohmic resistance and a negative parallel resistance connected in parallel thereto. The negative resistance can be formed in this connection in known manner by a feedback amplifier circuit with a transistor; the operating point of the transistor will then be controlled—as will be explained further below with reference to FIG. 3—by the control signal.

In FIG. 2, the voltage $u_{LC}$ occurring on the oscillatory circuit L, C, R for different boundary conditions is shown as a function of the time, it being assumed that the oscillatory circuit L, C is tuned precisely to the switching frequency of the switches ZS′ and ZS″, there will now be explained the manner of operation of the circuit of the invention shown in FIG. 1 for the adding and removal of attenuation on a two-wire line. In this connection, there will first of all be considered, with reference to FIG. 2*a* the transmission of signal energy only from the one side (1) of the two-wire line to the other side (2). At a phase *p*′ (cf. also FIG. 2*d*), the switch ZS′ is closed for a short time by a suitable control pulse so that during this closure time, signal energy can be transmitted from one side (1) of the two-wire line to the energy storer of the circuit in accordance with the invention, i.e., to the oscillatory circuit L, C, R. The signal energy taken up by the oscillatory circuit produces in the oscillatory circuit an oscillation which is attenuated or de-attenuated to a greater or lesser extent by the controllable parallel resistance R; depending upon whether the resistance of the parallel resistor R is positive, infinite or negative, there will be an attenuated, an unattenuated or a self-reinforcing oscillation, as indicated in FIG. 2*a* by a short-dash line, a solid line and a long-dash line. Accordingly, after half a period of oscillation, i.e., at the phase *p*″, the signal energy stored in the capacitor C of the oscillatory circuit is now correspondingly smaller than, equal to or larger than the signal energy taken up at the time of closure of the switch ZS′, i.e., at the phase *p*′, by the oscillatory circuit. At the phase *p*″, the switch ZS′ is now closed in pulse-like fashion so that the signal energy which has now just been stored can be transmitted by the switches ZS″ to the other side (2) of the two-wire line. Depending on the value of the resistance of the parallel resistor R, and thus on the time constant with which the signal energy stored in the oscillatory circuit decreases or increases, the signal power level on side (2) of the two-wire line is now less than or greater than previously on side (1) of the two-wire line. These processes are repeatedly periodically with the switching frequency of the switches ZS′ and ZS″, in which connection these two switches must be closed in pulse-like fashion in accordance with the scanning theorem of the transmission art, at least with twice the frequency of the maximum signal frequency to be transmitted each time.

It has already been briefly mentioned above that special measures can possibly be taken to avoid an impairment of the energy transmission as a result of the only pulse-like closing of the switches ZS′ and ZS″, even when the signals to be transmitted do not arrive already in pulse amplitude modulated form at the time of closing of a switch on the one side of the two-wire line and are to be tapped off at the time of closing of the other switch on the other side of the line. In this connection, it is already known per se to provide the switches with reactance networks. Such reactance networks are shown in FIG. 1 in connection with the two switches ZS′ and ZS″. In each case, they have the inductances $H_1$ and $1_1$ and $H_2$ and $1_2$ and the capacitances $K_1$ and $c_1$ and $K_2$ and $c_2$, respectively. The inductances $1_1$ and $1_2$ are series inductances; they serve in known manner as flywheel inductances and fulfill the task, upon the closing of a switch such as the switch ZS′ of transmitting the signal energy stored in the capacitor acting as storage capacitor, such as the capacitor $c_1$, completely over the switch or in reverse direction, transmitting over the switch energy fed in pulse-like fashion completely into the storage capacitor. For this purpose, the oscillatory circuit formed of such a coil with the series inductance 1 and such a capacitor with the shunt capacitance is to be so tuned that the period of its natural oscillation is twice as long as the corresponding time of closing of the switch ZS′ or ZS″. The switch elements K, H and *c* should be so dimensioned that they, in each case, form a low-pass filter, the cut-off frequency of which is at most half as great as the switching frequency with which the switches ZS′ and ZS″ are actuated in pulse-like fashion. The characteristic impedances of the low-pass filters are in this connection to be adapted in each case to the connected line. If these conditions are fulfilled, very specific values result for the different circuit elements of the reactance networks forming part of the switches. It then results that the low-pass filters permit passage of the oscillations connected with the information to be exchanged, but not oscillations of higher frequency connected to the switch pass trains. These oscillations of higher frequency therefore do not arrive at the end stations connected with each other by the two-wire line, and can therefore not cause any disturbances there.

In the circuit of the invention as shown in FIG. 1 an inductance 1 is now inserted furthermore between the connecting points of the two switches ZS′ and ZS″ and the oscillatory circuit L, C, R forming the energy storer. This inductance 1 acts, possibly together with the circuit elements of a reactance network described above, in such a manner that upon the closing of a switch, such as the switch ZS′, the signal energy stored in the energy storer LC of the circuit in accordance with the invention is transmitted completely to the one side of the two wire line, and possibly therefore first of all into the capacitor *c* acting as storage capacitor there, or vice versa. In order to obtain the desired complete energy transmission, the oscillatory circuit formed of the said coil having a series inductance 1 and the energy storer LC must be so tuned that its period of natural oscillation is twice as long as the corresponding time of closure of a switch ZS′ or ZS″. In this connection, the energy storer formed by a parallel oscillatory circuit LC may be considered as a capacitatively complex impedance since its natural frequency is tuned to the switching frequency of the switches ZS′ and ZS″ while the switching period T is greater than the corresponding switching time $t$ of the switches ZS′ and ZS″. By this inductance 1 connected in series with the energy storer LC of the circuit in accordance with the invention, there is obtained upon corresponding matching to the connected line, possibly in cooperation with a reactance network associated with a switch, practically an attenuation-free transmission, into the energy storer of signal energy fed from one side of the two-wire line and of stored signal energy toward the other side of the two-wire line—aside from losses in the switches ZS′ and ZS″, which will be discussed further below.

For the above explanation of the manner of operation of the circuit of the invention shown in FIG. 1, there was considered for the time being only the transmission of the signal energy from the one side (1) of the two-wire line to the other side (2). The explanations given in this connection apply, by analogy, however—due to the symmetrical construction of the circuit—also for transmission of signal energy in the reverse direction, i.e., from side (2) to side (1) of the two-wire line. In this connection, as can be noted from FIG. 2$b$, at the phase $p''$ at which the switch ZS′ is closed in pulse-like fashion, signal energy is transmitted from side (2) of the two-wire line into the oscillatory circuit L, C whereby an oscillation is again excited in the oscillatory circuit. This oscillation again passes attenuated or unattenuated, corresponding to the control signal which controls the resistor R or even self-reinforced. At the phase $p'$, the switch ZS′ is then closed in pulse-like fashion in which connection the energy stored at this very time in the oscillatory circuit is transmitted via the switch ZS′ to the side (1) of the two-wire line, possibly therefore first of all into the storage capacitor $c_1$ of the reactance network associated with the switch ZS′.

As can be noted from FIGS. 2$a$ and 2$b$, when signal energy is transmitted over the two-wire line only in one direction, energy is stored in the oscillatory circuit L, C only during half of the switching period of the switches ZS′ and ZS″ since after the feeding in of signal energy over one of the two switches after the half switching period, in each case the other switch is closed in pulse-like fashion, in which connection the oscillatory circuit gives off the energy stored at such time over said switch and remains practically without energy for the next half switching period. If now signal energy is transmitted in both directions over the two-wire line, then upon the closing of a switch not only will signal energy be transmitted from one side of the line into the energy storer, or conversely from the energy storer to one side of the signal line, but in each case there will be an exchange of signal energy between the energy storer, i.e., the oscillatory circuit L, C, and the corresponding side of the two-wire line, and possibly therefore the storage capacitor $c$ located there. The voltage $u_{LC}$ present on the oscillatory circuit L, C then for instance has a variation with time such as shown in FIG. 2$c$. This variation with time of the voltage shown in FIG. 2$c$ is obtained by simple superimposition of the voltage curves shown in FIGS. 2$a$ and 2$b$; for the sake of simplicity, it has been shown for only one of the curves ($R=\infty$). The switch in accordance with the invention thus, due to its symmetrical construction, and the symmetrical control with respect to time of its two switches ZS′ and ZS″ acts in each case as controllable attenuation member for the signals to be transmitted in both directions over the two-wire line (1), (2) which reduces the signal voltage level by the attenuation $a=T/2\cdot\tau=T/4RC$. Herein T is the switch period, with which a switch ZS′ or ZS″ is closed in pulse-like fashion, while $\tau=2RC$ is the corresponding time constant of the oscillatory circuit.

In this connection, as stated, the attenuation may also be negative, namely when attenuation is removed from the oscillatory circuit by means of a negative parallel resistor. The negative parallel resistor can in this connection be formed by a feedback amplifier circuit with a transistor, as can be noted from FIG. 3. The operating point of the transistor $Tr$ is controlled in this connection by the control signal fed via the line S, in which connection the transconductance of the transistor changes. In this way, however, the degree of removal of attenuation from the oscillatory circuit changes, since the negative resistance occurring parallel to the ohmic resistance W has the value $$r=\frac{du_{LC}}{di_C}=\frac{u.du_{BE}}{di_C}=u/S$$

in which $u_{LC}$ is the voltage present on the oscillatory circuit L, C, $u_{BE}$ is the base-emitter voltage and $i_C$ is the collector current of the transistor; $u$ is the transformer ratio of the transformer designated in the same manner, and S finally is the transconductance of the transistor.

The circuit of the invention shown in FIG. 3 has accordingly an attenuation $$a=\frac{T}{4.C}\cdot\left(\frac{1}{W}-\frac{S}{u}\right)$$

by which it changes the signal voltage level of the signals to be transmitted in each case over the two-wire line. In this connection, the attenuation may be positive or negative, depending on the selected operating point of the transistor, in which connection the change in the sign or in the amount of the resistance R connected in parallel to the oscillatory circuit (cf. of FIG. 1) which is effected by control of the working point of the transistor is without any disturbing influence on the matching conditions in the transmission system in question.

With the circuit of the invention described above, the energy storer whose time constant is variable as a function of the control signal, upon the time of closing of a switch, in each case takes up the entire signal energy offered from there. By the circuit in accordance with the invention, therefore, no reflections are caused in the two-wire line. This is of particular advantage, since in this way a high sidestone attenuation can be obtained in the transmission system containing the circuit of the invention which could be obtained only with difficulty and at great expense in the known attenuation compensating circuits.

In order to improve the transmission of signal energy over the switches ZS′ and ZS″ of the circuit in accordance with the invention, it may be advisable under certain circumstances, while maintaining the shunt capacitance $c_1$ and $c_2$ of the reactance network provided in connection with the switch ZS′ and ZS″ respectively in its original value to replace the coil having the series inductance $1_1$ or $1_2$ respectively passing to the switch ZS′ and ZS″ respectively by a pulse-forming reactance network also containing the shunt capacitance, and which gives an approximately square shape instead of a sinusoidal shape to the current pulse transmitted in each case over the switch. In this way the current load of the switch in question can be reduced and thus the transmission of the signal energy facilitated. This is of particular importance since as switches ZS′ and ZS″, with corresponding switching speed and switching frequency, electronic contacts are advantageously employed. In the case of electronic contacts which are developed of diodes or transistors, the peak current which occurs is of decisive importance for the dimensioning of the components. The higher the peak current, the more expensive the components which must be used. The case may even occur that with too high a peak current, no suitable components at all are available. Since in the case of the switches entering into question here, the transmission of the energy is compressed into a relatively very short period of time, namely, to the very short closure time *t* of the switches ZS' and ZS'', relatively high currents occur in the switch path. They can have several hundred times the intensity of the current otherwise flowing in the two-wire line.

When using such pulse-forming reactance networks, one can obtain a reduction of the intensity of the peak current, in connection with which the current pulses transmitted over the contacts are imparted an approximately square shape instead of the sinusoidal shape which they would have without the presence of the pulse-forming reactance network. Upon the occurrence of the square current pulse, the maximum current intensity is considerably less than upon the occurrence of a sinusoidal current pulse when in each case the same signal energy is transmitted over the switch path by such pulses in the same time interval. Such an approximately square pulse is now obtained by the use of the pulse-forming reactance networks. In this connection, the maximum current intensity can be reduced by more than 35%. In this connection, there is furthermore obtained also the advantage that at the same time the attenuation caused upon the transmission of energy over a switch ZS' or ZS'' by the latter is also reduced. The switch path of an electronic contact still has, as a matter of fact, a certain ohmic resistance even in connected state. Accordingly, a part of the energy actually to be transmitted is converted into heat on the switch path; therefore certain losses in energy occur upon the transmission. Since the energy converted into heat is proportional for constant resistance to the square of the current, by reducing the maximum current, a reduction of the losses is also obtained, and thus the operating attenuation caused by the switch is reached. The operating attenuation can be reduced by more than 15%.

The replacement of the coil leading to the switch by a pulse-forming reactance network must, of course, not change the essential properties of the low pass filter, namely its fixed cut-off frequency, and its characteristic impedance matched to the connected line. It is therefore also provided that the capacitance *c* is to be maintained in its original value. If this provision is complied with, the properties of the low-pass filter which enter into consideration are not varied by the incursion in the circuit.

Such a pulse-forming reactance network can for instance consist of individual different series oscillatory circuits which lie transverse to the two-wire line and the natural oscillations of which in each case have a period PT1, PT2, PT3 . . . which is twice as long as odd fractions of the closing time *t* of a switch ZS' and ZS'' respectively so that the successive series circuits seen in the direction from the low-pass filter $K_1$, $H_1$ or $K_2$, $H_2$ toward the switch ZS' or ZS'' respectively have the periods of natural oscillation $PT1=2t/1$, $PT2=2t/3$, $PT3=2t/5$, etc.; the shunt capacitance *c* is in this connection distributed over the capacitors of this series oscillatory circuit in such a manner that the resultant individual capacitances are related to each other like the squares of the periods of natural oscillation of the corresponding series circuits. Instead of this, of course, one can also use a network equivalent to this. Thus, for instance, the pulse-forming reactance network may consist of parallel oscillatory circuits connected in series with the switch ZS', ZS'', a series coil and the original storage capacitor of unchanged capacitance *c*, in which connection this pulse-forming reactance network can be dimensioned as network equivalent to the former. It should be unnecessary here to give further details with regard to such pulse-forming reactance networks, particularly as the use of such pulse-forming networks has in itself already been proposed before.

Changes may be made within the scope and spirit of the appended claims which define what is believed to be new and desired to have protected by Letters Patent.

I claim:

1. A circuit arrangement for the attenuating or de-attenuating of two-conductor lines, comprising two periodically actuated switches staggered in time with respect to each other, and inserted in series in the two-conductor line, an energy storer, connected at the junction point of said switches, and variable means operatively connected to said energy storer, controllable by a control signal, for adjusting the time constant of said storer to a fixed value at which the desired attenuation or de-attenuation is achieved.

2. A circuit arrangement according to claim 1, wherein the energy storer is formed by a parallel oscillatory circuit having a natural frequency equal to the switching frequency with which the two switches are closed staggered uniformly in time from each other, or equal to an integral multiple of said frequency, said oscillatory circuit having a parallel resistance which comprises said variable means controlled by the control signal.

3. A circuit arrangement according to claim 2, wherein said controlled parallel resistance is formed by an ohmic resistance and a negative resistance connected in parallel thereto.

4. A circuit arrangement according to claim 3, wherein the negative resistance is formed by a feedback amplifier, the operating point of the amplifier element of which is controlled by the control signal.

5. A circuit arrangement according to claim 2, wherein a flywheel inductance is inserted between the connecting point of the two switches and the energy storer, in order to obtain a loss-free transmission of energy between the energy storer and one side of the two-wire line, the period of one natural oscillation of the oscillatory circuit consisting of the coil and the energy storer being twice as long as the time of closing of one of the switches.

6. A circuit arrangement according to claim 5, comprising, connected in series with each switch, a reactance network which is adapted to the corresponding section of the two-conductor line and comprises a low-pass filter, the cutoff frequency of which is smaller than half the switching frequency, having a storage capacitor as shunt capacitor and a coil leading to the respective switch as series inductance, the period of the natural oscillation of an oscillatory circuit comprising the coil and the storage condenser being twice as long as the closing time of the corresponding switch.

7. A circuit arrangement according to claim 6, wherein while maintaining the shunt capacitance in its original value, the coil leading to the respective switch is replaced by a pulse-forming reactance network which also contains the shunt capacitance and which gives the current pulse transmitted over the switch an approximately square shape rather than a sinusoidal shape.

References Cited by the Examiner

UNITED STATES PATENTS

| | | | |
|---|---|---|---|
| 2,927,967 | 3/60 | Edson | 179—15 |
| 2,962,552 | 11/60 | Crowley | 179—15 |
| 3,061,681 | 10/62 | Richards | 179—15 |

FOREIGN PATENTS

| | | |
|---|---|---|
| 221,992 | 6/59 | Australia. |
| 866,653 | 4/61 | Great Britain. |

DAVID G. REDINBAUGH, *Primary Examiner.*